US006411705B2

United States Patent
Oran et al.

(10) Patent No.: US 6,411,705 B2
(45) Date of Patent: *Jun. 25, 2002

(54) SIGNALING STATE MANAGEMENT SYSTEM FOR PACKET NETWORK GATEWAYS

(75) Inventors: David R. Oran, Acton, MA (US); Kevin J. Rowett, Cupertino, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/734,239

(22) Filed: Dec. 7, 2000

Related U.S. Application Data

(63) Continuation of application No. 09/107,071, filed on Jun. 29, 1998, now Pat. No. 6,188,760.
(60) Provisional application No. 60/084,812, filed on May 8, 1998.

(51) Int. Cl.[7] .................................................. H04M 7/00
(52) U.S. Cl. ...................................... 379/230; 379/229
(58) Field of Search ....................... 379/201.01, 207.02, 379/221.01, 229, 230

(56) References Cited

U.S. PATENT DOCUMENTS

| 4,506,358 A | | 3/1985 | Montgomery | |
|---|---|---|---|---|
| 4,991,169 A | | 2/1991 | Davis et al. | |
| 5,282,244 A | * | 1/1994 | Fuller et al. | 379/230 |
| 5,384,840 A | * | 1/1995 | Blatchford et al. | 379/230 X |
| 5,757,895 A | * | 5/1998 | Aridas et al. | 379/230 X |
| 5,799,317 A | * | 8/1998 | He et al. | 379/230 X |
| 5,822,420 A | * | 10/1998 | Bolon et al. | 379/230 |
| 5,848,069 A | * | 12/1998 | Milne et al. | 379/230 X |
| 6,052,458 A | * | 4/2000 | Amir-Ebrahimi | 379/230 X |
| 6,081,591 A | * | 6/2000 | Skoog | 379/230 |
| 6,188,760 B1 | * | 2/2001 | Oran et al. | 379/230 |

* cited by examiner

*Primary Examiner*—Creighton Smith
(74) *Attorney, Agent, or Firm*—Marger Johnson & McCollom, P.C.

(57) ABSTRACT

A signal state management (SSM) system avoids both the overhead of maintaining call state and complex signaling in a packet network gateway, while simultaneously providing a more scalable system by not placing too great a state or processing burden on the signaling or call processing server. The SSM system sends an event/action table from a call agent to the gateway that directs the gateway to detect and accumulate specified signaling events generated by a telephone. The gateway accumulates the signaling events according to the event/action table and notifies the call agent only when the signaling events specified in the event/action table are detected. The call agent then sends a new event/action table to the gateway that commands the gateway to detect and accumulate a new set of signaling events. After notifying the call agent, the gateway operates in a quarantine where all signaling events are queued. The gateway remains in the quarantine state until the new event/action table is received from the call agent.

42 Claims, 8 Drawing Sheets

| TYPE | ACTION | DESCRIPTION |
|---|---|---|
| SUPPRESS | IGNORE | THE EVENT IS ENTIRELY IGNORED BY THE GATEWAY |
| | ACCUMULATE | THE EVENT IS ADDED TO A LIST OF EVENTS TO BE SENT TO THE CALL AGENT WHEN AN EVENT WHOSE ACTION IS IN THE SEND CATEGORY OF THE TABLE OCCURS |
| SEND | SEND | THE EVENT, PLUS ALL PREVIOUSLY ACCUMULATED EVENTS, ARE SENT TO THE CALL AGENT |
| LOCAL PROCESSING | APPLY DIGIT MAP | SEE DESCRIPTION OF DIGIT MAPS |
| | SWAP AUDIO | REASSIGN THE CURRENT AUDIO OUTPUT TO THE NEXT AUDIO SOURCE IN A LIST (USED FOR HOLD/TRANSFER/CONFERENCE/ 3-WAY CALLING FUNCTIONS) |

FIG.2

| EVENT | CODE |
|---|---|
| FAX TONES | Ft |
| MODEM TONES | Mt |
| CONTINUITY TONE | Co |
| CONTINUITY DETECTED (VERIFIED) | Cv |
| ON-HOOK TRANSITION | Hu |
| OFF-HOOK TRANSITION | Hd |
| FLASH HOOK | Hf |
| DIGIT COLLECTION | INDIVIDUAL DIGITS (E.G. "#"), TIMERS ("T") OR RANGES (E.G. "[0-9]" OR "[0-9*#T]") |

FIG.3

| ACTION | CODE |
|---|---|
| NOTIFY IMMEDIATELY | N |
| ACCUMULATE | A |
| TREAT ACCORDING TO DIGIT MAP | D |
| SWAP | S |
| IGNORE | I |

FIG.4

```
Digit       ::= "0" | "1" | "2" | "3" | "4" | "5" | "6" | "7" | "8" | "9"
Timer       ::= "T"                         -matches the detection of a timer
Letter      ::= Digit | Timer | "#" | "*" | "A" | "B" | "C" | "D"
Range       ::= "x"                         -matches any digit
            | "[" Letters "]"               -matches any of the specified letters
Letters     ::= Subrange | Subrange Letters
Subrange    ::= Letter                      -matches the specified letter
            | Digit "-" Digit               -matches any digit between first and last
Position    ::= Letter | Range
StringElement ::= Position                  -matches an occurrence of the position
            | Position "."                  -matches an arbitrary number of occurrences
                                               of the position, including 0
String      ::= StringElement | StringElement String
StringList  ::= String | String "|" StringList
DigitMap    ::= String | "(" StringList ")"
```

{ 52 braces Digit, Timer, Letter, Range }

50 → DigitMap
54 → FIG.5

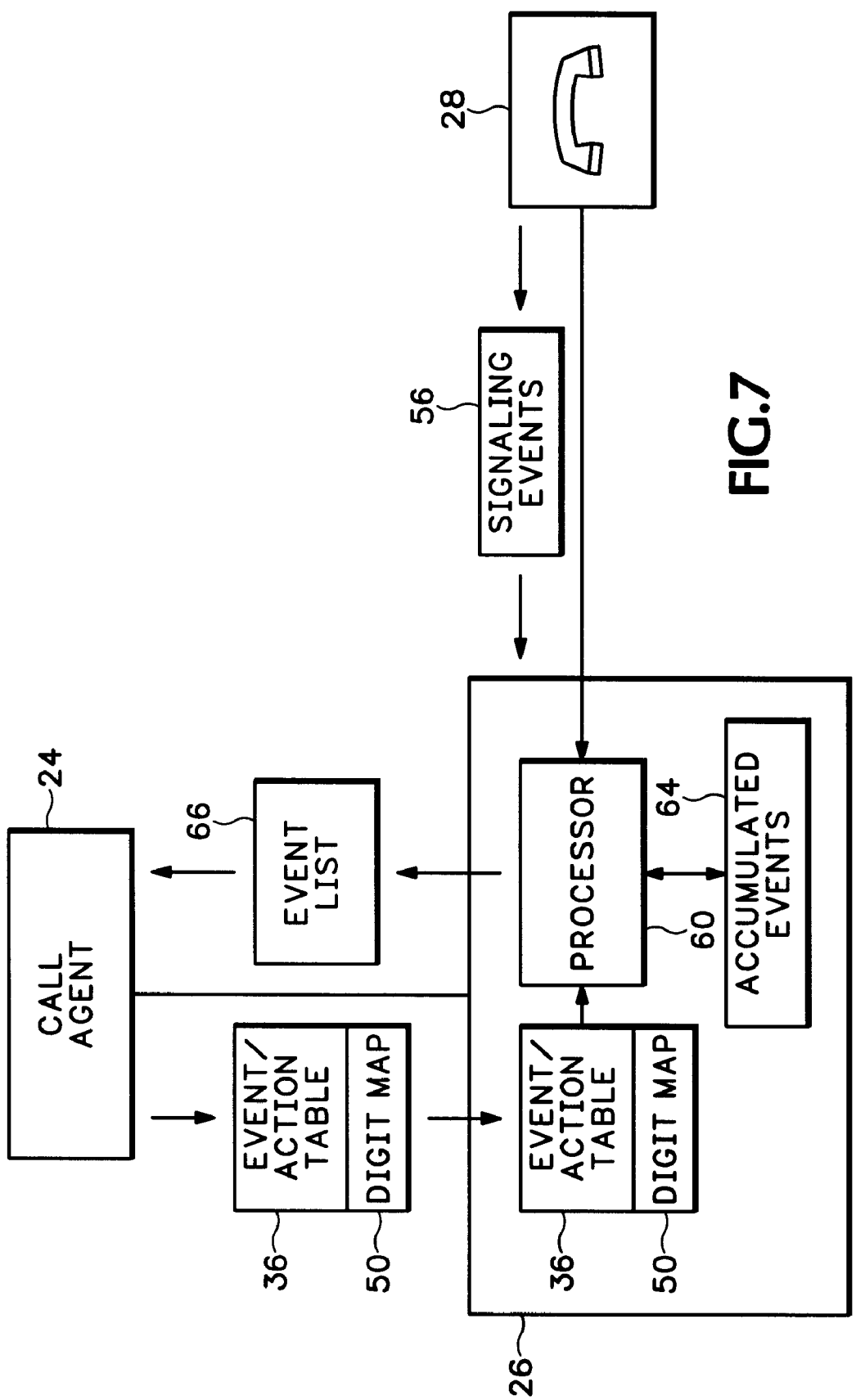

FIG.8

| | GATEWAY EVENT | GATEWAY ACTION | PROTOCOL | CALL AGENT |
|---|---|---|---|---|
| 80 | | | ⇐ NOTIFICATION REQUEST | SEND EVENT/ACTION AND DIGIT TO GATEWAY |
| 82 | | | ACK ⇒ | |
| 84 | OFF-HOOK | SEND | NOTIFY ⇒ | CHANGE STATE TO OFF HOOK |
| 86 | | | ⇐ ACK | CHANGE EVENT/ACTION TABLE SO GATEWAY PROCESSES THE DIGIT MAP |
| 88 | DIGIT | APPLY DIGIT MAP | | |
| 90 | DIGIT | APPLY DIGIT MAP | | |
| 92 | ... | ... | | |
| 94 | DIGIT | SEND | NOTIFY ⇒ | START TO PROCESS CALL |
| 98 | | | ⇐ ACK | CHANGE EVENT/ACTION TABLE TO IGNORE FURTHER DIGITS |
| 96 | ON-HOOK | | | |
| 100 | | SEND | NOTIFY ⇒ | STOP PROCESSING CALL AND RESET TO CLEAN STATE |
| 102 | | | ⇐ ACK | RELOAD INITIAL EVENT/ACTION TABLE AND DIGIT MAP |

FIG.9

| | GATEWAY EVENT | GATEWAY ACTION | PROTOCOL | CALL AGENT |
|---|---|---|---|---|
| 104 | | | ⇐ NOTIFICATION REQUEST | SEND EVENT/ACTION AND DIGIT TABLES TO GATEWAY |
| 106 | | | ACK ⇒ | |
| 108 | OFF-HOOK | SEND | NOTIFY ⇒ | CHANGE STATE TO OFF HOOK |
| 110 | | | ⇐ ACK | CHANGE EVENT/ACTION TABLE SO GATEWAY PROCESSES THE DIGIT MAP |
| 112 | DIGIT | APPLY DIGIT MAP | | |
| 114 | DIGIT | APPLY DIGIT MAP | | |
| 116 | ⋮ | ⋮ | | |
| 118 | DIGIT | SEND | NOTIFY ⇒ | START TO PROCESS CALL |
| 120 | | | ⇐ ACK | CHANGE DIGIT MAP TO ACCUMULATE CREDIT CARD NUMBER |
| 122 | DIGIT | APPLY DIGIT MAP | | |
| 124 | DIGIT | APPLY DIGIT MAP | | |
| 126 | ⋮ | ⋮ | | |
| 128 | DIGIT | SEND | NOTIFY ⇒ | PROCESS CREDIT CARD NUMBER |
| 130 | | | ⇐ ACK | CHANGE EVENT/ACTION TABLE TO IGNORE FURTHER DIGITS |

SIGNALING STATE MANAGEMENT SYSTEM FOR PACKET NETWORK GATEWAYS

This application is a continuation of Ser. No. 09/107,071 filed on Jun. 29, 1998, now U.S. Pat. No. 6,188,760, and claims priority from provisional application Ser. No. 60/084,812, filed May 8, 1998.

BACKGROUND OF THE INVENTION

This invention relates to managing signaling states in packet network telephony gateways and more particularly to handling telephony signaling in a way that minimizes state overhead in the gateway while allowing high scalability.

Packet telephony gateways are sometimes optimized to work in concert with common channel signaling protocols. For example, packet gateways operate with Common Channel Signaling System #7 (CCS#7) or with Integrated Services Digital Network (ISDN) PRI. These protocols allow signal processing entirely outside the gateway itself, such as in a dedicated call control system. This has the advantage of avoiding the need for maintaining any call state in the gateways.

For some types of telephony systems, such as those attached directly to analog telephones or to older trunk systems such as Ear and Mouth (E&M) or Channel Associated Signaling (CAS) systems, the gateway is involved in at least low level telemetry aspects of call signaling. In CAS-like scenarios, the gateway also needs to disentangle the channel associated signaling from truly in-band signaling, such as Dual Tone Multi Frequency (DTMF) signaling.

The types of telemetry signals received by the gateway from a telephone include on-hook and off-hook transitions, hook flash, progress tone detection (and possibly analysis) and DTMF detection and possible generation. For trunks connected via in-band signaling to PBXs, analog switches, etc., a gateway needs to hear various progress signals like busy, network congestion, etc. The gateway then needs to process (i.e. "progress tone analysis") and convert the signals into events.

The simplest approach is to back-haul telemetry-like signaling to a signaling or call processing server and treat the signaling in the call processing server identically as in the common channel signaling case. Unfortunately, this fails to scale for a couple of reasons. The number of independent signaling channels can be extremely large, possibly on the same order of magnitude as the number of stations on a local carrier's network. The number of messages generated can also be very large; many more than 2–3 per call as in the common channel signaling case. For example, every digit pressed while dialing a phone number can constitute a message that must be sent to the call process server. The back-haul signaling approach substantially increases network traffic between the gateway and the call processing server and requires additional computing resources to transmit, receive and process the back-hauled signaling.

Thus, a need remains for reducing the overhead required to maintain call states in the gateway while simultaneously providing gateway intelligence that allows the gateway to process telephone events more efficiently.

SUMMARY OF THE INVENTION

A signal state management (SSM) system according to the invention avoids both the overhead of maintaining call state and complex signaling in a gateway, while simultaneously providing a more scalable system by not placing too great a state or processing burden on the signaling or call processing server. Besides providing a more scalable system, the SSM system has the ability to create (possibly a dynamic) adaptation based on several varied classifications. Classifications can include user identity, type of service subscribed, time of day, type of gateway, location of telephone instruments within the network, etc. The system manages signaling without adding to the programming complexity, and processing burden of the packet gateway device.

The SSM system sends an event/action table from a call agent to the gateway. The event/action table directs the gateway to detect and accumulate specified signaling events generated by a telephone. The gateway detects and accumulates the signaling events according to the event/action table and notifies the call agent only when certain signaling events specified in the event/action table are detected. The call agent then acknowledges the notification by sending a new event/action table to the gateway that directs the gateway to detect and accumulate a new set of signaling events. The gateway then accumulates signaling events according to the new event/action table and only notifies the call agent when the signaling events specified in the new event/action table are detected.

After notifying the call agent, the gateway operates in a quarantine state where all signaling events generated by the telephone are queued by the gateway. The gateway remains in the quarantine state until the new event/action table is received from the call agent.

The event/action table can include a digit map that directs the gateway to accumulate signaling events into a dial string. The dial string is continuously compared with the digit map. Signaling events are added to the dial string if the current dial string is underqualified and only partially matches the digit map. The dial string is sent in a single message to the call agent current dial string matches a complete entry in the digit map. The event/action table specifies the events that the gateway is to detect such as tones, hook transitions and telephone digits. The event/action table also specifies actions that the gateway takes when the specified events are detected, such as ignore, send immediately and accumulate.

The foregoing and other objects, features and advantages of the invention will become more readily apparent from the following detailed description of a preferred embodiment of the invention, which proceeds with reference to the accompanying drawings.

BRIEF DESCRIPTION OF THE DRAWINGS

FIG. 2 is a table showing the types of actions specified in an event/action table used with the signaling state management system shown in FIG. 1.

FIG. 3 is a table showing events that can be specified in the event/action table according to the invention.

FIG. 4 is a table showing actions that can be specified in the event/action table according to the invention.

FIG. 5 is a BNF syntax for specifying an entry in the digit map.

FIG. 7 is a block diagram showing how the event/action table and digit map are used in the signaling state management system.

FIG. 8 shows an example of how the signaling state management system handles an aborted call.

FIG. 9 shows an example of how the signaling state management system handles a credit card call.

DETAILED DESCRIPTION OF THE INVENTION

Figure 1:
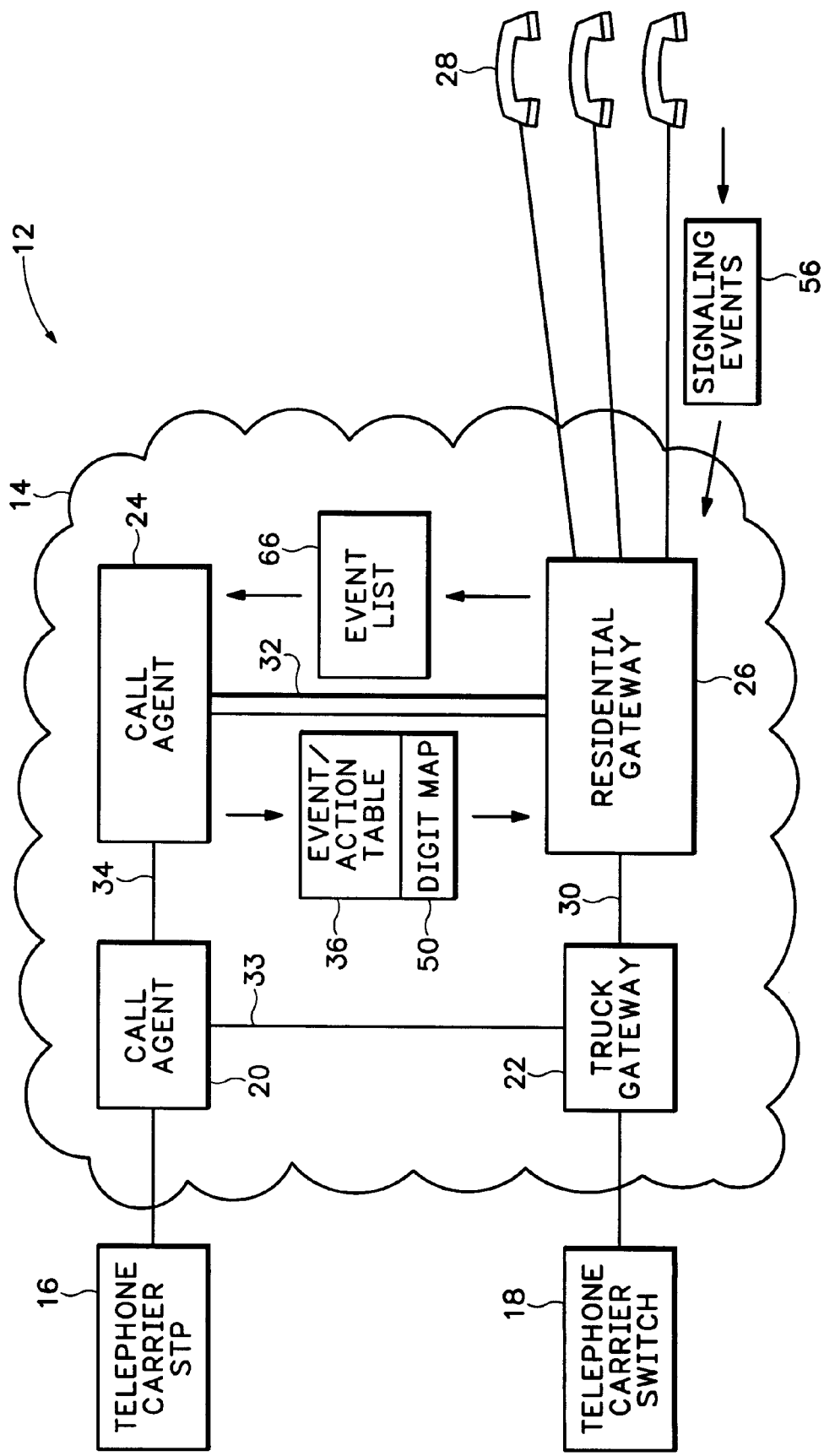
FIG. 1 is a block diagram of a signaling state management system according to the invention.

Referring to FIG. 1, a packet-based telephony system 12 includes circuit oriented telephones 28 that generate conventional telephony signals. A residential gateway 26 connects the telephones 28 to a packet network 14. The residential gateway 26 conducts the conversions between data packets containing audio data (audio packets) in the packet network 14 and audio signals coming from the telephones 28.

A Realtime Transport Protocol (RTP) is used over a link 30 to transfer the audio packets between the residential gateway 26 and a trunk gateway 22. A call agent 24 controls signaling events from telephone 28 through the residential gateway 26 via the signaling state management system according to the invention. A signaling and control protocol, such as SGCP can be used over link 32 and/or link 33. Call agent 24 communicates to another call agent 20 over link 34 using a conventional signaling protocol such as CCS#7. The call agent 20 connects to a telephone carrier Signal Transfer Point (STP) switch 16.

The residential gateway 26 is typically part of a router, personal computer, etc. and connects to standard telephones 28. The call agent 24 is typically located in a host server computer. The call agent 20 is a computer that controls the trunk gateway 22 through a protocol such as SGCP. The call agents 20 and 24 do not pass the actual audio data but control how the gateways 22 and 26, respectively encode, packetize, and route the audio data in packet network 14. The general hardware and software used in gateways 22 and 26 and call agents 20 and 24 for processing audio packets is known and is, therefore, not described in further detail. The call agent 24 that controls the residential gateway 26 is alternatively referred to as a signaling or call processing server 24. The residential gateway 26 is alternatively referred to as simply gateway 26.

The signaling state management (SSM) system according to the invention maintains synchronization with the control path used by the call agent 24 to control the gateway 26. There is little or no permanent configuration state in the gateway 26. The invention allows individual low level signals generated by telephones 28 to either be sent to the call agent 24, processed locally by the gateway 26, or entirely suppressed, under control of the call agent 24. For example, the gateway 26 can maintain a purely slave status in keeping with the simple control model.

An event/action table 36 is sent from the call agent 24 to the gateway 26. The event/action table 36 treats each signal from telephones 28 as a signaling event 56. Each event 56 is looked up in the table 36 by the gateway 26. The table 36 maps predefined events to predefined actions. The mapping and the types of actions are defined to be as stateless as possible to simplify processing in gateway 26. One key to the invention is that the event/action table 36 may be downloaded by the call agent 32 piggybacked on any control command or response from the call agent 24 to the gateway 26.

Digit strings may be accumulated by the gateway 26 without sending each digit to the call agent 24 for processing. A digit map 50 performs regular expression matching on a digit string from telephones 28 to determine if the accumulated digit string must be sent to the call agent 24. The digit map 50 is downloaded, when necessary, by the call agent 24 with the event/action table 36.

The gateway 26 has only a small, fixed set of actions defined by the event/action table 36, thus keeping the processing very simple. Typical actions include ignore, accumulate, send to call agent, invoke digit map, and swap audio to endpoint. When the specified event in the event/action table 36 or digit map 50 occurs, the gateway 26 notifies the call agent 24 with an event list 66.

Referring to FIG. 2, the event/action table 36 maps telemetry-style signaling events from any one of the telephones 28 to actions taken by the gateway 26. The actions are of three types: suppress, send, or local processing. The event/action table 36 is sent from the call agent 24 to the gateway 26 whenever the call processing server 24 needs to change the mapping of events to actions. The event/action table 36 may be piggybacked on any control message and may be encoded in any number of ways depending on the protocol it is embedded in. As an example, the event/action table 36 can be encoded in any existing voice over IP (VoIP) signaling or control protocol, such as Simple Gateway Control Protocol (SGCP) or H.323 RAS. The invention is not limited to use only with the SGCP syntax. However, for explanation purposes, some signaling state management operations are described in the context of the SGCP environment.

Table 37 in FIG. 2 identifies the actions in the gateway 26 that are controlled by the call agent 24 via the event/action table 36. When the event/action table 36 sends an Ignore action, the gateway 26 ignores the specified event. An Accumulate action causes the gateway 26 to add the event to the event list 66 to be sent to the call agent 24. The gateway 26 sends the event list 66 to the call agent 24 when an event specified by a Send action in the event/action table 36 is detected. The Send action causes the gateway 26 to send the specified event and all previously accumulated events to the call agent 24. An Apply Digit Map action causes the gateway 26 to apply events to the digit map 50 that is described in further detail below. A Swap Audio action causes the gateway 26 to reassign a current audio output to a next audio source in a list. This action is used for hold, transfer, conference and 3-way calling functions.

FIGS. 3 and 4 show detailed tables of the events and actions implemented in the event/action table 36. An event table 38 in FIG. 3 provides a list of events 40 that can be specified by the call agent 24. Each event 40 is identified by a code 42 and include fax tones, modem tones, continuity tones, hook transitions and digit collection.

Each event 40 can be qualified by a requested action, or by a list of actions 46 defined in action table 44. The actions 46, when specified, may be encoded in a variety of ways such as a list of keywords, an ASN.1 data structure, etc. The actions 46 have associated codes 48. The actions 46 include notifying the call agent 24 immediately (N), accumulating events (A), treating the event according to a digit map (D), swapping calls (S) and ignoring the event (I). The swap action is used for handling hook-flash locally at the gateway 26. The telephone 28 may be connected to two calls at the same time. The gateway 26 does not want to notify the call agent 24 each time a user hits hook-flash in order to switch between the two calls. Thus, the call agent 24 uses the Swap action to allow the gateway 26 to handle hook-flash locally.

When no action 46 is specified, the default action is to notify the event to the call agent 24 immediately (N). This means that, for example, ft and ft(N) are equivalent. Events that are not listed are ignored.

Digit Map

Of significant importance to the invention is a digit map 50 that allows events associated with dialing of telephone numbers, PINs, credit card numbers, etc., to be "batched" and sent as one message by the gateway 26 to the call agent 24. Conventional signaling protocols require the gateway 26 to perform one of the following:

1. Send every single digit as it is entered, resulting in considerable overhead in the call agent. This is how legacy telephony switches and most ISDN systems operate.
2. Have an explicit "Send" user interface action, like a cellular phone.
3. Rely on a timeout to guess when the user is finished dialing digits.
4. Have a complete dial plan locally in the gateway 26 so the number can be parsed locally. This is infeasible for most numbering plans, especially international plans.

Figure 6:
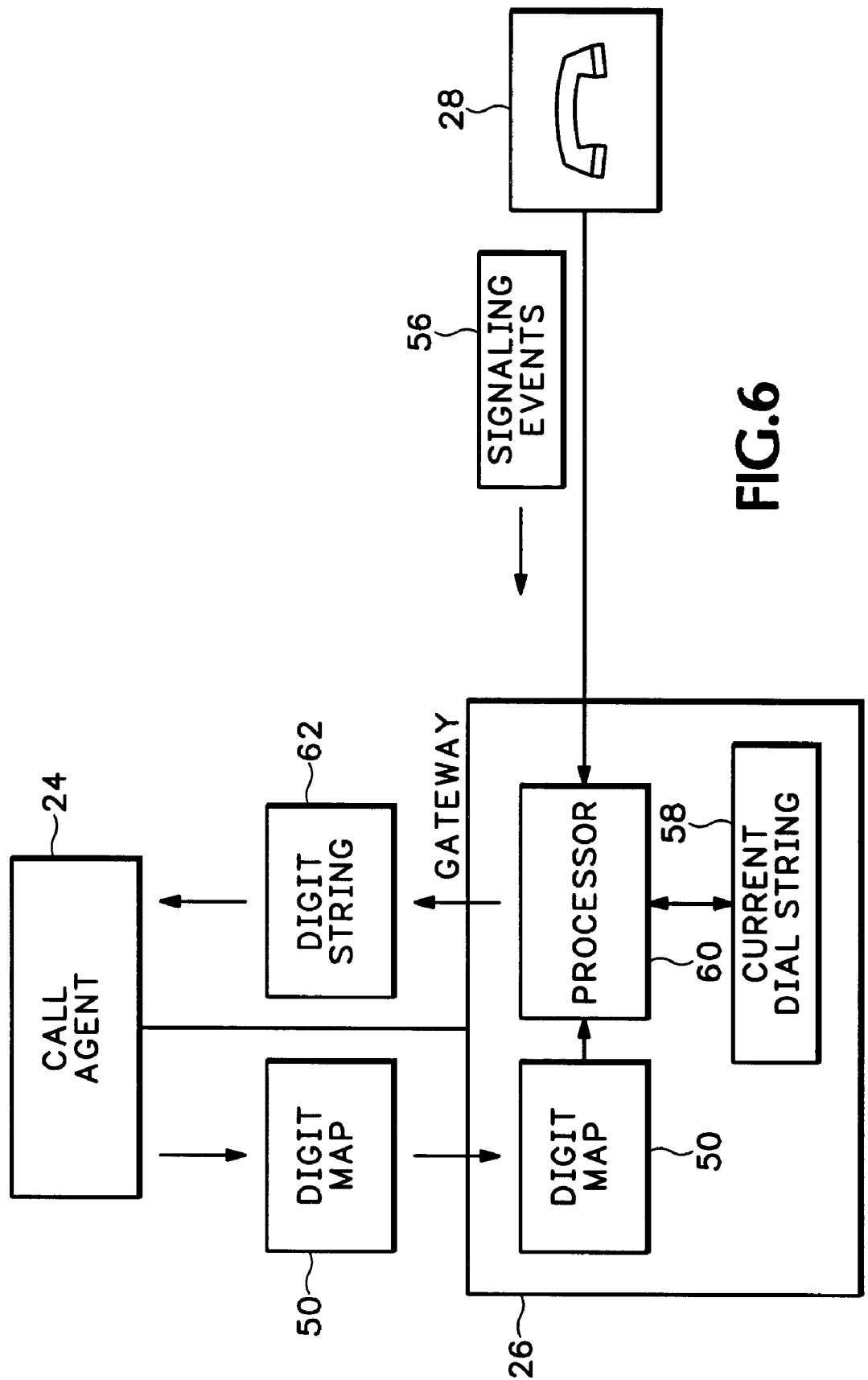
FIG. 6 is a block diagram showing how the digit map in FIG. 5 is used in the signaling state management system.

Referring to FIGS. 5 and 6, the digit map 50 is represented as regular expressions. Any regular expression syntax can be used, such as that used by a Unix egrep utility. The digit map 50 is encoded in the control protocol used between the call agent 24 to the gateway 26, such as in the SGCP protocol.

The digit map 50 is stored in the gateway 26 and used to detect predefined events 56 such as digits, letters or timers. The gateway 26 adds the event parameter code 42 (FIG.3) as a token to the end of an internal state variable called the "current dial string". The current dial string 58 is derived by accumulating signaling events 56 from telephone 28. The current dial string 58 is applied to the digit map 50 by a processor 60. The processor 60 attempts to match the current dial string 58 to each regular expression in the digit map 50 in lexical order. If the result is under-qualified (current dial string partially matches at least one entry in the digit map), nothing further is done by the gateway 26. If the result matches, or is over-qualified (i.e. no further digits could possibly produce a match), the digit string 62 is sent to the call agent 24 by processor 60.

For example, the digit map 50 may tell the gateway 26 to accumulate a specified group of digits and then send the accumulated digits to the call agent 24. The call agent 24 may determine the received accumulated digits are credit card numbers. The call agent 24 then sends a new digit map 50 that directs the gateway 26 to look for a PIN, a telephone number, or anything else the call agent deems appropriate at this stage of the signaling state for this call.

Referring to FIG. 7, an example of an event/action table 36 is as follows:

R: hu(N), hf(S,N)

The call agent 24 in the event/action table 36 commands immediate notification (N) of a "on hook transition" (hu) for the telephone 28. The call agent 24 also requests a call swap (S) and immediate notification (N) when a "flash hook" event (hf) occurs on the telephone 28. The gateway 26 stores the event/action table 36 and monitors for the events hu and hf from the telephone 28. Events detected by the gateway 26 are provided to the call agent 24 in the event list 66. The event codes in the event list 66 are the same as those used in the event/action notification request from the call agent 24. In a first event list 66, the gateway 26 notifies the call agent 24 of two flash-hooks (hf) and an on-hook transition (hu).

O: hf,hf,hu

In a second event/action table 36, the call agent 24 requests immediate notification (N) of an "on hook" transition (hu). The call agent 24 also requests the gateway 26 to treat digits 0–9 and timers according to a digit map (D). The digit map 50 is sent along with the event/action table 36. The entries in the event/action table 36 are as follows:

R: hu(N), [0–9#T](D)

Events that have been accumulated according to the digit map 50 are grouped in a single string by processor 60. The events that correspond with an event/action table 36 or match the digit map 50 are sent in the event list 66 to call agent 24. In a second event list 66, the gateway 26 notifies the call agent 24 of an off-hook transition (hf) and then notifies the call agent 24 of a string of digits (8295555) generated by the telephone 28 within a time (T) specified by a timer.

O: hf

O: 8295555T

Synchronization with Control Path

In order to prevent race conditions between the detection of signaling events 56, reporting it to the call agent 24, receiving a new event/action table 36, and the detection of other signaling events 56, the SSM system ensures two key properties or invarients are always met. After detecting an event, all further events are "quarantined" or otherwise "queued up" until either disposed of locally by the gateway 26, or the gateway 26 has sent the event to the call agent 24 and received a response, possibly with a new event/action table 36.

Quarantining events means the gateway 26 stops processing signaling events according to the event/action table 36. Subsequent events are stored while the gateway 26 waits to hear back from the call agent. The stored events are processed after an acknowledgment is sent back from the call agent 24. The reason the gateway 26 waits to respond to the new events, is because the call agent 24 may change the event/action table 36. This ensures each one of the events 56 is processed according to an event/action table 36 synchronized with the call agent 24. The call agent 24 can provide a new event/action table 36 or digit map 50, or both, in any response sent to the gateway 26. These two invariants ensure that every event 56 is processed in the context of the current state of the whole system, as seen by the call agent 24. Unlike a simple backhaul protocol, the SSM system is tightly synchronized with the rest of the gateway control and may piggyback event/action tables on any control message.

For example, a race condition can occur during three-way telephone calling. When a first call is established, hitting hook-flash generates a dial tone for establishing a second call. If the two calls are now established, hitting hook-flash switches between the two already established calls. The user may have already established the first call and is about to establish the second telephone call. If a hook-flash happens after the second call is established, the gateway 26 should switch to the second call. If a hook-flash happens before the second call is established, the gateway should establish a dial-tone.

The gateway 26 is not allowed to interpret the hook-flash until the call agent 24 has acknowledged the last notified event. Thus, the SSM system avoids the hook-flash race condition described above. Because the call agent 24 is always aware of the call state context in which to interpret any signaling event, race conditions inherent in other management schemes are avoided.

FIG. 8 shows an example of how the signaling state management system operates for an aborted call. The events described in FIG. 8 occur when a user picks up the telephone 28, dials a phone number, and then decides to abandon the call before completing the call. This shows two critical aspects of the invention. First, the digit map 50 processing by the gateway 26 avoids sending messages to the call agent 24 on every digit press. Second, the quarantining of signaling events 56 by the gateway 26 only processes an on-hook event, caused by the user hanging up, only after the call agent 24 acknowledges the prior notification with the entered digits.

In step 80, the call agent 24 sends the event/action table 36 and a digit map 50 (if appropriate) to the gateway 26. This primes the gateway 26 with the information needed for processing the signaling events 56 from telephone 28. Signaling events 56 are discarded until the gateway 26 receives the event/action table 26. The gateway 28 then acknowledges receipt of the table to the call agent 24 in step 82. All messages are acknowledged by call agent 24. In step 84, a user picks up the telephone 28 creating an off-hook event. The event/action table 36 includes a command to notify the call agent 24 immediately when an off-hook event occurs. The gateway 26 accordingly notifies the call agent 24 of the off-hook event and then quarantines all further events received from the telephone 28.

The gateway 26 at this point will not take any other action, other than accumulating further signaling events 56, until there is an acknowledgement from the call agent 24. This is because the action that the gateway 26 may depend on the next event/action table 36 that the call agent 24 may send in response to the off-hook notification. The call agent 24 in step 86 acknowledges the notification from the gateway 26 by changing the event/action table 36 and digit map 50. The digit map 50 tells the gateway to look for a phone number.

The gateway in step 88 receives a digit from the telephone 28. The gateway does not notify the call agent 24 yet because the current accumulated dial string does not match the entire digit map 50. The gateway 26 in steps 90 and 92 continues to add digits to the current dial string 58 and apply the digits to the digit map 50. A fully qualified match of the current dial string 58 with the digit map 50 occurs in step 94. Accordingly, the gateway 26 sends the current dial string to the call agent 24.

In step 96, a user decides for some reason not to make the telephone call and hangs up the telephone 28. The gateway 26 accordingly receives an on-hook event. The gateway 26 cannot notify the on-hook event to the call agent 24 at this point, because on-hook may warrant a different action depending on the next event/action table 36 sent by the call agent 24. The on-hook event is, therefore, quarantined by the gateway 26 until an acknowledgment (ACK) of the dial string notification is sent by the call agent 24.

The call agent 24 sends the acknowledgement in step 98 that includes a new event/action table 36. The new event/action table 36 directs the gateway 26 to ignore further digits because the user has completed dialing the phone number. The new event/action table 36 also directs the gateway to immediately notify the call agent 24 if an on-hook event "hu(N)" is detected.

If the call had been to an emergency service, such as 911, the call agent 24 may have loaded an event/action table 36 that commands the gateway 26 to ignore events such as on-hook to ensure the user remains connected. In this case the following interaction would not occur until the emergency service released the call.

In step 100, the gateway 26 has received the acknowledgement from the call agent 24 in the form of a new event/table 36. The on-hook event is therefore, no longer quarantined and, in turn, notified by the gateway 26 to the call agent 24. The call agent 24 then stops processing the call identified in the dial string previously sent by the gateway 26. The call agent 24 resets to a clean state in step 100. In step 102 the call agent 24 acknowledges the on-hook event by sending a new event/action table 36 to gateway 26. The new event/action table 36 has the effect of resetting the gateway to the initial state in step 80.

Referring to FIG. 9, a second call example starts out in steps 104–110 identically as steps 80–86, respectively, in the call described in FIG. 8. However, in steps 112–116 the user has dialed the access number for a credit card call. The gateway in step 118 notifies the call agent 24 of the current dial string when it fully matches the current digit map 50. The call agent 24 determines from analyzing the dial string that the dialed number is a credit card call and that a credit card number has to be obtained before connecting the call. In step 120, the acknowledgement from call agent 24 to the gateway 26 includes a new digit map 50 that directs the gateway 26 to accumulate a string of any 9 digits before sending another notification to the call agent 24.

The gateway 26 in steps 122–126 accumulates a string of 9 digits from telephone 28. In step 128 the gateway 26 notifies the call agent 24 of the dial string that terminates the digit map 50. The call agent 24 after analyzing the credit card number, allows the call to proceed. The call agent 24 in step 130 acknowledges the notification from gateway 26 with a new event/action table 36 that commands the gateway to ignore further digits from the telephone 28. The telephone call then proceeds normally. This example shows the ability of the SSM system to change the digit map 50 at any time, depending on the state of the call.

The SSM system operates with any type of packet based network, such as Internet Protocol (IP), Frame Relay, Asynchronous Transfer Mode (ATM), etc. By controlling all signaling states with the call agent 24, the gateway 26 can have relatively simple intelligence. However, the bit mapping performed by the gateway 26 substantially reduces the processing and communication bandwidth required to process gateway events. Thus the SSM system allows intelligence in the packet gateway 26 to be drastically simplified while allowing the entire packet telephony system 12 to scale much better than heavy-weight signaling techniques such as H.323.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A method for managing signaling states in a packet network, comprising:
sending a map to a gateway that directs the gateway to accumulate specified signaling events;
receiving a batched message back from the gateway containing the signaling events accumulated by the gateway according to the map;
sending a new map that causes the gateway to accumulate signaling events according to the new map; and
receiving a new batched message back from the gateway containing the signaling events accumulated by the gateway according to the new map.

2. A method according to claim 1 including causing the gateway to operate in a quarantine state where all signaling events are accumulated and not acted upon until an acknowledgment of the batched message is sent back to the gateway.

3. A method according to claim 1 including sending an event table to the gateway that directs the gateway to detect specified signaling events.

4. A method according to claim 3 including using the event table to cause the gateway to take specified actions when events identified in the event table are detected.

5. A method according to claim 3 including using the event table to cause the gateway to send a notification message for a detected signaling event.

6. A method according to claim 3 including using the event table to cause the gateway to accumulate signaling events.

7. A method according to claim 3 including using the event table to cause the gateway to process the signaling events according to the map.

8. A method according to claim 3 including using the event table to cause the gateway to ignore the signaling events.

9. A gateway for managing signaling states, comprising:
a device configured to receive an operating state message for accumulating signaling events;
the device configured to generate a notification message when the signaling events specified in the operating state message are accumulated; and
the device configured to receive a new operating state message that changes the signaling events accumulated by the device.

10. A gateway according to claim 9 wherein the device is configured to stop processing signaling events and only accumulating signaling events until receiving and acknowledgement of the notification message.

11. A gateway according to claim 9 wherein the operating state message specifies telephone signaling events to be detected or accumulated by the device and what telephone signaling events initiate sending the notification message.

12. A gateway according to claim 9 wherein the operating state message specifies what actions that the device takes when the specified telephone signaling events are detected or accumulated.

13. A gateway according to claim 9 wherein the operating state message tells the device to immediately send the notification message after detecting one of the specified signaling events.

14. A gateway according to claim 9 wherein the operating state message tells the device to add a next one of the signaling events to a list and send the list when a next one of the signaling events is a send event.

15. A gateway according to claim 9 wherein the operating state message tells the device to ignore at least some of the specified signaling events.

16. A gateway according to claim 9 wherein the operating state message includes a map that specifies which signaling events are batched together and sent as one message.

17. A gateway according to claim 16 wherein the signaling events specified in the map comprise digits, letters or timers.

18. A system for managing signaling states, comprising:
a call agent configured to send a message specifying signaling events to be accumulated or detected, and configured to receive a notification when the signaling events specified in the message are accumulated or detected; and
the call agent then configured to send a new message that changes the signaling events to be accumulated or detected.

19. A system according to claim 18 wherein the processing of the signaling events are accumulated but not processed until the call agent acknowledges the notification by sending the new message.

20. A system according to claim 18 wherein the message is sent to a gateway and specifies what telephone signaling events should be accumulated or detected by the gateway and notified back to the call agent.

21. A system according to claim 18 wherein the message specifies what actions should take when the specified telephone signaling events are accumulated or detected by the gateway.

22. A system according to claim 18 wherein the message requests immediate notification back to the call agent when one of the specified signaling events is accumulated or detected.

23. A system according to claim 18 wherein the message directs addition of a next one of the signaling events to a list and sending of the list to the call agent when the next one of the signaling events is a send event.

24. A system according to claim 18 wherein the message directs at least one of the specified signaling events to be ignored.

25. A system according to claim 18 wherein the message includes a map that specifies which signaling events to batch together and send to the call agent as one message.

26. A system according to claim 25 herein the signaling events specified in the map comprise digits, letters or timers.

27. Computer code stored on a computer readable medium for managing signaling states in a packet network, comprising:
code for sending a map to a gateway that directs the gateway to accumulate specified signaling events;
code for receiving a batched message back from the gateway containing the signaling events accumulated by the gateway according to the map;
code for sending a new map that causes the gateway to accumulate signaling events according to the new map; and
code for receiving a new batched message back from the gateway containing the signaling events accumulated by the gateway according to the new map.

28. Computer code according to claim 27 including code for causing the gateway to operate in a quarantine state where all signaling events are accumulated and not acted upon until an acknowledgment of the batched message is sent back to the gateway.

29. Computer code according to claim 27 including code for sending an event table to the gateway that directs the gateway to detect specified signaling events.

30. Computer code according to claim 29 including code for using the event table to cause the gateway to take specified actions when events identified in the event table are detected.

31. Computer code according to claim 29 including code for using the event table to cause the gateway to send a notification message for a detected signaling event.

32. Computer code according to claim 29 including code for using the event table to cause the gateway to accumulate signaling events.

33. Computer code according to claim 29 including code for using the event table to cause the gateway to process the signaling events according to the map.

34. Computer code according to claim 29 including code for using the event table to cause the gateway to ignore the signaling events.

35. A system for managing signaling states in a packet network, comprising:
  means for sending a map to a gateway that directs the gateway to accumulate specified signaling events;
  means for receiving a batched message back from the gateway containing the signaling events accumulated by the gateway according to the map;
  means for sending a new map that causes the gateway to accumulate signaling events according to the new map; and
  means for receiving a new batched message back from the gateway containing the signaling events accumulated by the gateway according to the new map.

36. A system according to claim 35 including means for causing the gateway to operate in a quarantine state where all signaling events are accumulated and not acted upon until an acknowledgment of the batched message is sent back to the gateway.

37. A system according to claim 35 including means for sending an event table to the gateway that directs the gateway to detect specified signaling events.

38. A system according to claim 37 including means for using the event table to cause the gateway to take specified actions when events identified in the event table are detected.

39. A system according to claim 37 including means for using the to cause the gateway to send a notification message for a detected signaling event.

40. A system according to claim 37 including means for using the to cause the gateway to accumulate signaling events.

41. A system according to claim 37 including means for using the to cause the gateway to process the signaling events according to the map.

42. A system according to claim 37 including means for using the to cause the gateway to ignore the signaling events.

* * * * *

UNITED STATES PATENT AND TRADEMARK OFFICE
CERTIFICATE OF CORRECTION

PATENT NO.    : 6,411,705 B2
DATED         : June 25, 2002
INVENTOR(S)   : Oran et al.

It is certified that error appears in the above-identified patent and that said Letters Patent is hereby corrected as shown below:

Column 10,
Line 27, "herein" should read -- wherein --.

Column 12,
Lines 8, 11, 14 and 17, "using the to cause" should read -- using the event table to cause --.

Signed and Sealed this

Nineteenth Day of November, 2002

Attest:

JAMES E. ROGAN
Attesting Officer        Director of the United States Patent and Trademark Office